Aug. 7, 1945.   D. NEWMARK   2,381,134
MOLDED BALSA ARTICLE
Filed April 11, 1944
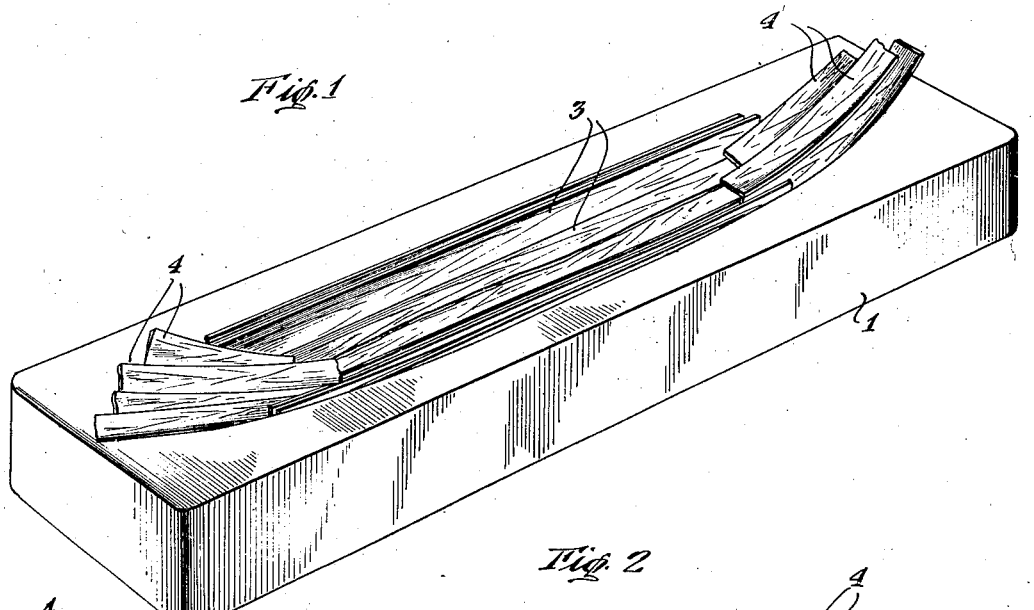
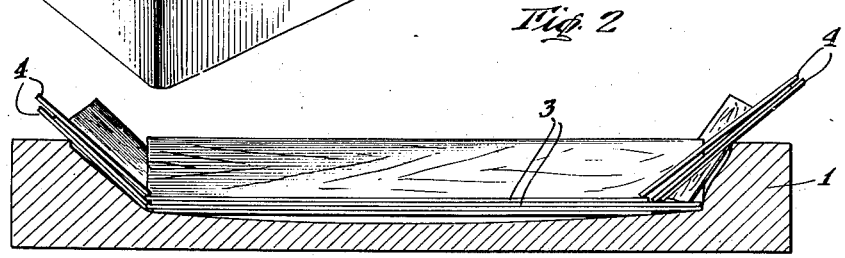
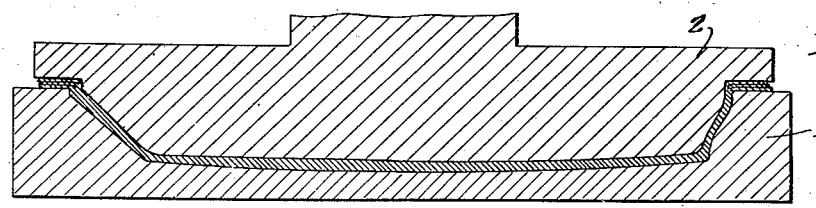
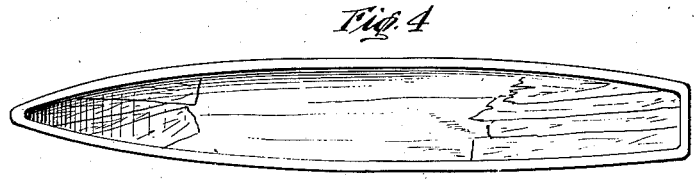
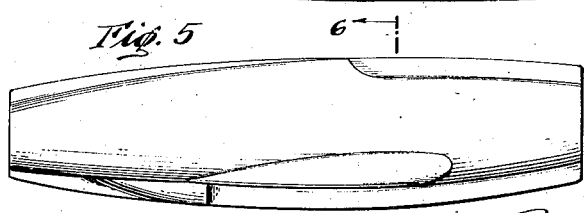
INVENTOR.
David Newmark
BY
Frederick W. Barker
ATTORNEY Patented Aug. 7, 1945

2,381,134

UNITED STATES PATENT OFFICE 2,381,134

MOLDED BALSA ARTICLE

David Newmark, New York, N. Y., assignor of one-half to William Kramer, New York, N. Y.

Application April 11, 1944, Serial No. 530,581

1 Claim. (Cl. 144—309)

This invention relates to the pressure molding of balsa wood into hollow or solid structures and my improvement is directed to the utilization of the compressible nature of balsa for the production of a variety of objects, such for example as model airplane fuselages and wings, model ship hulls, doll heads, fishing lures, duck decoys and other hollow or solid articles.

Heretofore balsa has been used in sheet form as well as in whittled block form for the production of different articles, but to the best of my knowledge and belief it is new with me to take advantage of the compressibility of balsa for molding it in a moist state under pressure, at a suitable degree of heat. This I consider my discovery and in my practice I have for example been able to compress balsa sheet plies into deep extrusions and corners, to the extent of shaping a model ship's hull of commensurate depth for such a structure.

In carrying out my invention I take thin sheets of balsa, all considerably smaller than the mold itself, such sheets for example having a thickness of 1/16 inch, impregnate them with a solution of urea resin, or other suitable adhesive, and place these sheets in a female mold; the ends of the sheets may be overlapped. A series of layers are used to achieve any desired thickness. Then the male mold is pressed into the female mold under sufficient pressure to compress the interposed ply sheets whereupon compression and extrusion occur.

In practice I have found that a pressure of 200–300 pounds to the square inch is sufficient for the purpose.

The mold members are subjected to a certain degree of heat, such for example as 200° F., so that the process of molding balsa comprises the employment of heated molds in which the adhesive impregnated balsa is by pressure compressed into desired extruded conformations.

Because of the compressibility of balsa I have found it practicable to introduce small strips or pieces of balsa, together with the sheets or leaves thereof, into the female mold, as for the purpose of filling out sharp corners in said mold, to the end that the object to be molded will acquire its completed form and contour in the molding operation. As has been stated the inherent compressibility, of balsa under the molding conditions set forth, enables these small strips and pieces to become, as it were, homogeneously welded in with the balsa mass in the female mold as compressed under pressure by the male mold, these mold elements being at the desired temperature and all the balsa parts having been subjected to the adhesive solution.

The small strips or pieces of balsa, disposed at random with the balsa sheets in the female mold, have the effect of acting as binders under compression pressure, thereby serving to strengthen or reinforce the molded mass of the formed object.

Other features and advantages of my invention will hereinafter appear.

In the drawing—

Figure 1 is a perspective view of a female member of a mold or die, with balsa parts or slats shown placed therein.

Fig. 2 is a cross-section of Fig. 1.

Fig. 3 is a cross-section of a complete mold or die.

Fig. 4 is a top plan view of a completed product.

Fig. 5 is a side elevation of a molded airplane fuselage, and

Fig. 6 is a section on the line 6—6 of Fig. 5.

In Figs. 1 to 3 let 1 indicate the female mold or die part employed by me in molding the hull portions of toy ships, and, in Fig. 3 there appears the male mold or die part 2.

Placed within the female mold part 1 are slats or pieces of balsa 3, which slats or pieces have previously been impregnated and thus moistened with a suitable adhesive solution, and then into the male mold part 2 is entered the female mold part under desired applied pressure, both mold parts being heated to a suitable temperature, for the purpose of compressing the contained balsa pieces or slats and thereby molding them to the shape and contours established by the die cutting in the mold parts.

It should be appreciated that the compressible characteristic of balsa, not possessed by other woods, is what enables this material to be employed in the manner indicated.

In addition to the strips or slats 3 of balsa placed in the mold there is added a quantity of relatively small pieces 4, care being used to have the sharp corners of the mold filled with these small pieces, and then the press is closed.

The small pieces are really in "suspension" in the pile and are not affected by the die until actual contact is made. If large sheets were used they would be apt to be in contact with the male die before the press was closed, thus causing the sheets to tear. The small strips, laid willy-nilly in the female mold, form the basis of the extrusions and deep impressions, thus constituting an homogeneous compacted mass.

The ship hull of Fig. 4 and the airplane fuselage of Figs. 5 and 6 are merely examples of toys and small articles capable of production by the instant process of molding from balsa.

Variations within the spirit and scope of my invention are equally comprehended by the foregoing disclosure.

I claim:

The process of molding articles entirely from balsa wood which consists in impregnating balsa strips including relatively large and small pieces with an adhesive solution, placing said moist strips between female and male mold members with the small pieces adjacent the mold corners, applying heat at around 200° F. to said mold members, and subjecting said balsa strips to a compression pressure of from 200 to 300 pounds per square inch to accord the compressed mass a desired extruded conformation.

DAVID NEWMARK.